Aug. 12, 1958  M. F. BECHTOLD  2,846,727
AQUEOUS DISPERSIONS OF POLYMERS AND SHAPED ARTICLES THEREFROM
Filed Sept. 30, 1953

```
┌─────────────────────────────────────────────────────────────────────┐
│ POLYMER PARTICLES OR AQUEOUS POLYMER DISPERSION + AQUEOUS SOLVENT SALT │
└─────────────────────────────────────────────────────────────────────┘
                                │ MIXING
                                ▼
        ┌──────────────────────────────────────────────┐
        │ DISPERSION OF POLYMER IN AQUEOUS SALT SOLUTION │
        └──────────────────────────────────────────────┘
                                │ FORMING
                                ▼
              ┌─────────────────────────────────┐
              │ SHAPED OBJECT OF THE DISPERSION │
              └─────────────────────────────────┘
                                │ REMOVE PART OF WATER FROM DISPERSION
                                ▼
┌─────────────────────────────────────────────────────────────────┐
│ COALESCED SHAPED OBJECT (E.G., CLEAR FILM OF POLYMER / SALT / WATER) │
└─────────────────────────────────────────────────────────────────┘
                                │ WATER WASH
                                ▼
        ┌──────────────────────────────────────────────┐
        │ OPAQUE SHAPED OBJECT WITH SALT REMOVED (E.G., FILM) │
        └──────────────────────────────────────────────┘
                                │ DRY
                                ▼
        ┌──────────────────────────────────────────────┐
        │ OPAQUE SHAPED OBJECT (SALT AND WATER REMOVED) │
        └──────────────────────────────────────────────┘
                                ▼ PRESSURE (APPLIED TO FILM)
                            ▓▓▓▓▓▓▓▓  - PRESSURE SOURCE, E.G., TYPE FACE
```

OPAQUE AREA OF FILM (DUE TO OPEN CELL VOIDS)

TRANSPARENT AREA OF FILM CLEARED BY PRESSURE

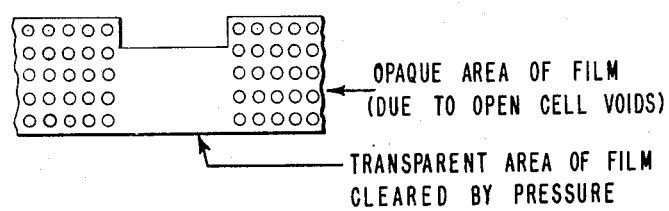

INVENTOR
MAX FREDRICK BECHTOLD

BY Lynn Barratt Morris
ATTORNEY

United States Patent Office 2,846,727
Patented Aug. 12, 1958

2,846,727

AQUEOUS DISPERSIONS OF POLYMERS AND SHAPED ARTICLES THEREFROM

Max Fredrick Bechtold, Kennett Square, Pa., assignor to E. I. du Pont de Nemours and Company, Wilmington, Del., a corporation of Delaware Application September 30, 1953, Serial No. 383,374

20 Claims. (Cl. 18—57)

This invention relates to organic polymer dispersions. More particularly, it relates to the provision of useful aqueous dispersions of polymers and to the provision of a process for shaping articles therefrom and to the resultant shaped articles.

This application is a continuation-in-part of my application Serial No. 231,273, filed on June 12, 1951 and now abandoned.

Shaped articles from organic polymers that do not easily coalesce or melt are usually fabricated from solutions of the polymers. Organic solvents are, in general, used. These are disadvantageous because of their high cost, the expense of solvent removal and recovery, explosive and toxic hazards involved and, frequently, because of chemical instability. Certain organic polymers have been found to be soluble in concentrated aqueous solutions of certain salts. Satisfactory fabrication of shaped articles from these polymer solutions would obviate the disadvantages of organic solvents. However, it is impossible to obtain with an aqueous salt solvent, under conditions which avoid degradation of the polymer by heating, a solution that is both high in polymer content and contains high molecular weight polymer. This is, of course, due to extremely high viscosity developed as the concentration of dissolved high molecular weight polymer increases. Compromises on either lower polymer content or lower molecular weight polymer to attain a viscosity sufficiently low for fabrication generally give an inferior quality product, and/or increased cost.

Accordingly, it is an object of this invention to provide polymer compositions which do not involve organic solvents and yet which can be used to form shaped articles. It is a further object to provide useful aqueous polymer compositions and processes for converting them to shaped articles. Another object is the production of opaque films which can be selectively cleared. Other objects appear hereinafter.

The objects of this invention are accomplished by shaping articles from dispersed polymers in discrete particulate form in aqueous metal salt media. The polymer is dispersed in an aqueous medium having dissolved therein an inorganic salt in an amount of about 4% to about 55% based on the final composition. The salts that are effective in this process are those which in more concentrated solutions dissolve the polymer. Only non-solvent concentrations of the salt are used in making the dispersion. The dispersion is then shaped and water is evaporated from the shaped structure until coalescence occurs. The salt is washed from the resultant shaped article. The shaped article can be readily plasticized by immersing the article while in the gel state in relatively non-volatile liquids or media containing such liquids which are softeners or plasticizers for the polymers. Also, the shaped articles are frequently drawn, either with or without plasticization. The dispersions of this invention contain less than 35% and generally at least 2% by weight of polymer, an amount of salt at least one-half the weight of the polymer but insufficient to form salt solutions which dissolves the polymer, the salt being one whose aqueous solution at a substantially higher concentration of salt and adequate temperature is a solvent for the polymer. In the production of films by the above described process certain polymers are converted to opaque films which can be selecitvely cleared as, for example, by the application of pressure. These clearable films differ from the non-clearable films in that they have an open-cell structure whereas the non-clearable films have a closed-cell structure. The open-cell films have low bulk density and high permeability to fluids, such as water vapor. The latter is about 10 times greater than that of the closed-cell or non porous films.

The attached drawing which is a part of this application, illustrates the process described above in the form of a "flow sheet."

In the examples, which are given for illustrative purposes only and are not limitative and which show the wide scope of this invention, the parts are by weight and all processes were carried out at room temperature (about 25° C.) unless otherwise stated.

*Example I*

An aqueous dispersion of polyacrylonitrile was prepared from the following ingredients:

0.10 part potassium persulfate
0.033 part of sodium bisulfite
2.0 parts of sodium lauryl sulfate
120 parts of water
80 parts of acrylonitrile The above substances were placed in a bottle capable of containing 350 parts of water and the free space of the bottle flushed with nitrogen gas and the bottle sealed. After mixing the contents by relatively mild agitation of the bottle for 16–17 hours at 40° C., the resultant polymer dispersion contained 36–40% solid material as determined by evaporation of a portion of the dispersion at 60° C.

An aqueous solution of lithium bromide (50%) was poured with stirring into a portion of the aqueous dispersion of polyacrylonitrile until the stirred mixture passed from a gelatinous condition to a fluid condition. At this point, the addition of the salt solution was stopped, and a portion of the mixture was cast on a glass plate. The assembly was dried for a few minutes in an oven at 95° C. until the opaque coating became transparent and tough. After cooling the film was stripped and immersed in water to wash out inorganic material. This treatment caused the film to stiffen and to become translucent.

In another experiment, to 2 parts of a polyacrylonitrile aqueous dispersion (38.7% solids) prepared as above was added 3 parts of a 44.4% cadmium iodide solution. Films and fibers cast from this dispersion and coalesced at 80° C. were washed in water. The resultant salt-free articles were tough.

*Example II*

To 20 parts of a 39.8% solids polyacrylonitrile aqueous dispersion prepared as in Example I was added 20 parts of a 40% solution of calcium bromide. This mixture was then subjected to ball milling. The resultant dispersion was cast by means of a doctor knife as a 5-mil coating on a glass plate, and the coated plate was heated in an oven at 90° C. for five minutes. After cooling, the coating was stripped and washed in water. The resultant wet film was transparent to translucent and was tough.

*Example III*

To 20 parts of a 36.2% polyacrylonitrile aqueous dispersion prepared as in Example I was added 80 parts of a 25% solution of lithium bromide in acetone. The acetone was removed by heating on a steam bath. At this point the dispersion attained a total solids (polymer plus salt) content of 71%. Continuous films were obtained therefrom by casting the dispersion, coalescing the cast film by evaporation at 90° C., then washing it in water. Strong fibers were obtained by extruding the dispersion through a moving spinneret onto a stationary glass plate which was at a temperature of 90° C. After the extruded lines of dispersion were converted to clear fibers by partial evaporation, the fibers were stripped off, stretched, then washed in water while under tension. The fibers were strong before and after being dried at 90° C. Their tensile strength was found to be 2.0 grams per denier.

*Example IV*

An aqueous dispersion of polymethacrylonitrile was prepared by the technique described in Example I. The following charge was used:

0.10 part of potassium persulfate
0.133 part of sodium bisulfite
1.0 part of sodium lauryl sulfate
60 parts of water
40 parts of methacrylonitrile Agitation at 40° C. for 64.5 hours produced a dispersion of 38.8% total solids.

To 20 parts of the polymethacrylonitrile aqueous dispersion was added 30 parts of an aqueous solution of lithium bromide (66⅔% lithium bromide) with stirring. The resultant dispersion was cast 5 mils thick as a coating on a glass plate. The coated plate was dried 5 minutes at 90° C. to coalesce the coating. The coating was then stripped and washed in water. The resultant film was continuous and translucent. Fibers were prepared by extrusion of the dispersion through a spinneret moving relative to a rigid substrate. After drying until coalescence occurred (2 minutes at 90° C.), the fibers were stripped, drawn, washed under tension and dried.

*Example V*

Polyacrylonitrile powder (16 parts) of molecular weight 70,000 was ball milled with 78 parts of a 21.8% calcium thiocyanate aqueous solution. The resultant dispersion was cast in the form of fibers and films; coalescence of the particles within the fibers and films was attained by drying in air with relative humidity less than about 50%. The fibers were then stripped, drawn, washed while under tension, and dried. The film was stripped, washed and dried.

*Example VI*

Polyvinyl alcohol (5 parts) was soaked in 56.67% aqueous calcium thiocyanate (95 parts). The mixture was then warmed on the steam bath with stirring until solution was complete. A portion of this polyvinyl alcohol solution (15 parts) was diluted with water (15 parts) and cooled to −2° C. This cooled, diluted solution was then added with stirring to 20 parts of an aqueous dispersion of polyacrylonitrile (39% solids, prepared as in Example I), which was at 4° C. After being ball milled for 1½ hours, the resultant dispersion, containing polyvinyl alcohol in solution form was extruded through a spinneret onto a glass plate, with the plate moving relative to the spinneret. After drying in the air, the coalesced dispersion was stripped from the glass. When stretched and washed under tension in water, then dried, strong, opaque polyacryonitrile/polyvinyl alcohol fibers were obtained.

*Example VII*

An aqueous polyacrylonitrile dispersion (15 parts), containing 39% solids, prepared as in Example I, was mixed with 15 parts of an aqueous dispersion of polytetrafluoroethylene containing 6.04 parts of the polymer. To this combined dispersion was added with stirring 30 parts of 56.67% aqueous calcium thiocyanate. The entire mixture was ball milled 1½ hours. By this process, a doughlike, yet fluid mixture was obtained that coalesced to a tough film when cast and dried partially at 80° C. on a glass plate. When stripped and washed in water, then dried in the room air, this film yielded a tough, opaque, leather-like film. Although the polytetrafluoroethylene is not coalescible at relatively low temperatures from its own dispersion, the dispersion mixture yielded a strong blend of materials upon coalescence.

*Example VIII*

A dispersion of acrylonitrile/butyl methacrylate copolymer was prepared by the polymerization technique of Example I, using the following ingredients:

0.05 part of potassium persulfate
1.0 part of sodium lauryl sulfate
60.0 parts of water
8.0 parts of butyl methacrylate
32.0 parts of acrylonitrile A dispersion of 36.7% total solids was obtained.

To a portion (20 parts) of this aqueous dispersion of acrylonitrile/butyl methacrylate copolymer at 4° C. was added with stirring 30 parts of a 28.33% calcium thiocyanate solution at −7° C. The resultant dispersion was cast (five mils thickness) on a glass plate, coalesced by drying at room temperature, and washed and stripped. By this means, there was obtained a clear, coherent film.

*Example IX*

A propylene/sulfur dioxide/maleic anhydride polymer (4 parts), in which the propylene to sulfur dioxide mole ratio was about one to one and the weight percentage of maleic anhydride was about 7.5, was stirred into 15 parts of 28.33% calcium thiocyanate in water. Then 9.15 parts of water was added with stirring. The resultant dispersion was extruded as a fiber through a spinneret moving relative to a glass plate. The dispersion fibers coalesced upon drying at room temperature. The resultant clear fibers were stripped, drawn and washed while under tension. This caused the fibers to stiffen, strengthen, and to become opaque.

*Example X*

A copolymer dispersion was prepared by the technique of Example I, using the same procedure, except that 20 parts of vinylidene chloride was substituted for 20 parts of the acrylonitrile, and the polymerization was conducted for 60 hours, at which time a dispersion containing 37.9% total solids was obtained.

A portion of this copolymer dispersion (20 parts) at 4° C. was mixed with 30 parts of 28.33% calcium thiocyanate aqueous solution at −7° C. The resultant dispersion was cast as a 5-mil coating on glass which coating was dried partially for coalescence, and the resultant film was stripped, then washed in water, and dried at 110° C.

*Example XI*

This example illustrates the various techniques for orienting polyacrylonitrile-containing objects prepared by coalescence of polyacrylonitrile dispersions in aqueous salt solutions to obtain films and fibers that are tough after being freed from salt and dried.

A polyacrylonitrile aqueous dispersion was prepared by the technique of Example I, using the following materials:

0.10 part of potassium persulfate
1.0 part of sodium lauryl sulfate
120 parts of water
80 parts of acrylonitrile A dispersion containing 38.6% total solids was obtained.

To 160 parts of the above polymer dispersion at −4° C. there was added with stirring 240 parts of 28.33% aqueous calcium thiocyanate solution at −7° C. Films were prepared by casting the resultant dispersion at room temperature as a coating on a glass plate. As the dispersion coating was partially dried, it was transformed by coalescence into a clear, tough, rubbery coating, which was stripped in air at about 25° C. and 50% relative humidity. Portions thereof were treated further by the following techniques with the results indicated:

(a) A coalesced film was immersed in water until free of salt, then dried at room temperature. A clear film resulted.

(b) A second coalesced film was washed and dried as in (a), then was drawn by immersing it in boiling water and extending its area in two dimensions, as much as possible without tearing, in the plane of the film; the film was then removed and dried. A clear, tough film resulted. A similar result was obtained without drying before immersion in boiling water.

(c) A third coalesced film was drawn in the room air by extending it in two dimensions in the plane of the film. While held in extended condition, it was next contacted with water at room temperature, and washed free of salt. It was found advantageous for optical perfection to keep the film taut during washing and drying. After drying, a clear, tough film was obtained that had a tensile strength of 22,000 lb./in.$^2$

Example XII

To 6 parts of the coalescible dispersion prepared as in Example XI was added, with stirring, 18 parts of water. The resultant dispersion was cast on glass, warmed in air at 90° C. until coalesced, then washed in water, and stripped. A very thin, tough film was obtained.

This shows that a high proportion of water can be tolerated in a coalescible polymer dispersion in an aqueous salt solution.

Example XIII

A polyacrylonitrile polymer having a molecular weight much higher than those of polymers used commercially was used in this experiment.

A solution (1) was prepared by stirring 2 parts of polymer powder into 98 parts of dimethylformamide at 0° C., then warming the mixture to 100° C. A viscous, non-homogeneous, barely-pourable gel was obtained. It was not possible to prepare homogeneous solutions of appreciably higher concentration of this polymer because the high viscosity prevents complete mixing, even at temperatures at which considerable degradation of the polymer occurs. Solution (2) was prepared by stirring 12.5 parts of the polymer powder into 87.5 parts of 56.7% aqueous calcium thiocyanate solution at −7° C. Upon warming to room temperature, this mixture was transformed to a bubble-containing, rubbery mass that could not be poured from the vessel, nor did it flow to conform to the shape of the vessel during 60 days standing. Films were prepared from these solutions, and from a dispersion (3) of polyacrylonitrile in aqueous calcium thiocyanate prepared by the method of Example XI. The following table shows the processes used and the results obtained:

approximately 300 lb./sq. in. was required for good flow out. Dispersion (3) was cast freely into a film. Immersion of the coalesced film in running water substantially removed the salt residues within two minutes.

From the above, it can be seen that the processes of this invention can be used successfully with polymers that have molecular weights so high that ordinary techniques (1 and 2) are inapplicable.

Example XIV

Polytetramethyleneurea (8 parts) was dry ball-milled to a fine powder, then 12 parts of water was added for further ball-milling to obtain an aqueous dispersion. To this dispersion at 4° C. was added with stirring 30 parts of 28.33% aqueous calcium thiocyanate which had been cooled to −7° C. This dispersion was then ball-milled for 16 hours, then was extruded through a spinneret onto a glass plate, with the plate moving relative to the spinneret. Next, the under side of the plate was warmed with a Bunsen burner until the top surface reached a temperature of about 140–165° C. The fibers became clear. Next the fibers were stripped, stretched from 4 to 5 times their initial lengths, and were washed in water. Strong fibers were obtained in this manner. Drawing is alternately accomplished by immersing the salt-containing, coalesced fibers in water and drawing during washing.

Example XV

A mixture of 200 parts of 39% polyacrylonitrile dispersion, 150 parts of water and 150 parts of a 56% calcium thiocyanate solution was made at 4° C. and mixed in a ball mill for 2 hours at room temperature. The mixture was fed through a glass capillary onto the top of a rotating metal casting wheel. The 20-inch diameter wheel was heated internally with 100° C. steam while it turned at 30 feet per minute. The mixture flowing from the capillary onto the wheel formed a fine opaque filament which coalesced (became transparent) by the time the wheel had rotated 90°. The bottom surface of the casting wheel passed through a pan of 30° C. water and the calcium thiocyanate in the coalesced fiber was extracted at this point. The fiber hardened and was separated from the surface of the wheel after it had passed through the water. A long fiber was collected by this process and drawn 8 times at a temperature of 218° C. The resulting filament had a tenacity of 2.7 g./d., an elongation of 8.3% and a tensile modulus of 69 g./d.

Example XVI

To 40 parts of an aqueous polyacrylonitrile dispersion at 4° C. (39.8% solids, prepared as in Example I) there was added with stirring 60 parts of an aqueous solution 28.3% by weight of calcium thiocyanate at −7° C. After bead-milling for one-half hour at room temperature, fibers were extruded onto a glass plate through a No. 21 hypodermic needle moving relative to the plate.

| Solution or Dispersion | Viscosity [1] | Percent Polymer | Process | Film |
|---|---|---|---|---|
| (1) Polymer dissolved in dimethyl-formamide. | ca. 10,000 p.. | 2 | Spread with spatula to 10 mils thickness on glass. Dried at 100° C. Leached in H$_2$O (100° C.) to remove dimethylformamide. | Very thin, opaque areas present, lumpy surface. |
| (2) Polymer dissolved in 56.7% Ca(SCN)$_2$. | Too high to measure. | 12.5 | Pressed out on glass at 10 mils. Washed in H$_2$O. | Nonhomogeneous, bubbled, yellowed, warped, shrunken. |
| (3) Polymer particles dispersed in aq. Ca(SCN)$_2$. | 30 p.. | 15 | Cast at 10 mils on glass, coalesced at 25° C., washed in water. | Tough, transparent, visually smooth. |

[1] Results obtained by the falling sphere method using a Pyrex sphere 0.74 cm. in diameter.

It was noted also that solution (1) was stringy so that it was impossible to spread a smooth film, and that the solvent was leached out with difficulty. Solution (2) was formed into a thin layer only by application of pressure;

After the fibers became coalesced by drying 5–10 minutes in the room air until clear, they were stripped, drawn 4 to 6 times their original length, then were washed in water.

Hanks of 0.05 part each of these dispersion-spun polyacrylonitrile fibers and of polyacrylonitrile fibers spun by extrusion, according to previously-known procedures, of a dimethylformamide polymer solution into air followed by washing and drawing were boiled for one hour in a dye bath containing 0.5 part of a red acetate dye, 5.0 parts 10% Ivory soap in water and 99 parts of water. The liquid level was kept constant during boiling by addition of water. The hanks were removed and rinsed in water. The color rinsed off of the dry-spun fibers completely while a medium to strong shade remained on the dispersion-spun fibers. Approximately one-half of the color strength remained even after "soaping off" by boiling one-half hour in 1% Ivory soap in water.

Similarly successful dyeings on the dispersion-spun fibers were obtained using blue and yellow acetate dyes and a green vat dye, whereas these dyes under similar conditions gave unsuccessful dyeings with dry-spun fibers.

It has been found that the dispersion-cast gel polyacrylonitrile objects can be softened or plasticized by treatment in relatively involatile liquids or solutions of such liquids to give clear, pliable objects, regardless of whether or not the liquid and the polymer are compatible in the usual sense, e. g. soluble in each other. Liquids found to be especially useful for the plasticizing or softening of dispersion-cast polyacrylonitrile films include polyalkylene glycols and esters thereof, e. g. trimethylene glycol di-2-ethyl hexanoate, polyethylene glycol, polyalkylene glycol and ester ("Ucon" 50–HB–5100 and LB625), cyclic carbonates, e. g. cyclic trimethylene carbonate, cyclic sulfones, e. g., tetramethylene cyclic sulfone, lactones, e. g., dilactone of 4,7-dihydroxy-decanedioc acid, N-alkyl amides, e. g. N-lauryl-N-methyl formamide, esters of carbonic and sulfonic acid, e. g. phenyl diglycol carbonate and phenyl cetane sulfonate, nitriles, e. g. adiponitrile, nitro compounds, e. g., o-nitrobiphenyl, and lactams, e. g. caprolactam. These liquids appear to remain liquid in the gel film and do not resinify. Dispersion-cast gel films of polymethacrylonitrile are also susceptible to plasticization by this technique.

*Example XVII*

A dispersion-cast polyacrylonitrile gel film prepared as in Example XI (*a*), except that it was stored under water after washing instead of being dried, was immersed in liquid "Carbowax" 1500 at 70° C. for five minutes. The excess liquid was wiped off, then the impregnated gel film was baked sixteen hours at 75° C. Slight exudation of the "Carbowax" occurred during this baking. The resultant film was clear and plasticized.

*Example XVIII*

A polyacrylonitrile gel film rectangle 12" x 10¾" x 0.002" prepared as in Example XVII was squeegeed to remove excess water, was immersed in a solution of 5% adiponitrile in water at room temperature for one-half hour, during which time it shrank to 10" x 8½". The film was removed, squeegeed to remove excess liquid, then was clamped at the edges of and in contact with a chromium-plated steel plate and was dried one-half hour at 50° C. The film was cut at the edges of the clamp and removed. It was clear, tough, pliable and free of any unabsorbed liquid. It had high tear strength and high elongation, which are characteristic of the polymer solvent-type plasticization.

*Example XIX*

An aqueous dispersion of polymer was prepared by the technique of Example I using the following charge:

0.05 part potassium persulfate
1.0 part sodium lauryl sulfate
60 parts water
32 parts acrylonitrile
8 parts styrene The resultant acrylonitrile-styrene polymer dispersion contained 38.2% solids. A dispersion of the polymer in aqueous calcium thiocyanate was prepared by the technique of Example XI using the following charge:

78.4 parts of above aqueous polymer dispersion
117.6 parts of 28.3% $Ca(SCN)_2$ in $H_2O$ A gel film was prepared by casting the aqueous calcium thiocyanate polymer dispersion at 5 mils on glass, coalescing it in air at 75° C., and stripping and washing in water at room temperature. This gel film was plasticized by the technique of Example XVIII using a 20% solution of "Santicizer" M–17 (methyl phthalyl ethyl glycolate) in isopropyl alcohol, except that drying was at 105° C. for one-half hour. No exudation occurred, and the resultant film (1.5 mils thick) was tough and had high impact resistance. It contained about 24% by weight of plasticizer. The weight loss from a sample of this film heated one hour at 75° C. was less than 0.23%, and weight loss from another sample soaked in water at room temperature for one-half hour, then baked one-half hour at 75° C. was only 2.5%; it suffered substantially no loss of toughness.

Although many shaped objects as described in the foregoing examples are clear, in certain instances products are obtained which are opaque but which can be clarified by the application of heat or pressure. As illustrated by the following examples, advantage can be taken of this property for the preparation of products of utility in the printing and photographic art. In these examples, calcium thiocyanate has been employed as the salt since it generally produces films of greater strength and higher opacity than other salts.

*Example XX*

An acrylonitrile/isobutylene copolymer was prepared according to the general procedure of U. S. 2,531,196. The copolymer has an inherent viscosity of 1.16 (0.2% concentration by weight in dimethylformamide at 25° C.) and contained 25.2 mol percent of isobutylene.

A coalescible dispersion of the polymer was formed by milling for 88 hours the following materials in a ball mill containing ½ inch glass balls:

32 parts of the acrylonitrile/isobutylene copolymer
80 parts of water
128 parts of 28.5% aqueous calcium thiocyanate There resulted a foamy dispersion that was readily de-aerated by evacuation in a stirred vacuum flask.

A portion of the dispersion was cast on plate glass with a doctor knife set at 20 mils. The glass with dispersion was next heated at 80° C. until coalescence of the polymer had occurred (became clarified), and was then cooled to room temperature. The film was stripped from the glass, after immersion in water, and was washed with water until free of thiocyanate ion. Next, this gel film was softened by being immersed in a 10% solution of "Flexol" 4GO (polyethylene glycol di-2-ethylhexoate) in isopropyl alcohol for one-half hour at room temperature, then was drained and dried 0.5 hour at 50° C. while clamped in a frame at fixed area. The dried film removed from the frame after cooling to room temperature was highly opaque and tough. The opaque film had an average thickness of 0.0080 cm. and an open-cell porous structure.

On application of a pressure of 10,000 lb./sq. in. to the above film, it became clear. The clarified film had an average thickness of 0.0040 cm. Another film prepared in the same manner with a doctor knife set at 30 mils was 0.0200 cm. thick before pressing and 0.0100 cm. after clarification at the same pressure.

Optical evaluation of similar opaque and clarified films prepared from 75/25 acrylonitrile/isobutylene copolymer with the General Electric Recording Spectrophotometer gave the following results:

| Nature of Film | Thickness (cm.) | Percent Transmission or Reflectance (R) at Various Wavelengths | | |
|---|---|---|---|---|
| | | 4,000 A. | 5,500 A. | 7,000 A. |
| Opaque | 0.0083 | 1.0 (87R) | 3.2 (87.7R) | 5.0 (85R) |
| Clarified | 0.0047 | 34 | 66.2 | 72.7 |

*Example XXI*

An acrylonitrile/isobutylene copolymer containing 23.6 mol percent of isobutylene and having an average inherent viscosity of about 4.3 was converted to a coalescible dispersion by ball milling the following composition for 20 hours with ½ inch glass beads as follows:

32 parts of copolymer
98 parts of water
128 parts of 28.6% aqueous calcium thiocyanate The resultant foamy dispersion was transferred with the use of 50 parts of water to reduce the viscosity to a stirred vacuum flask and deaerated by alternate evacuation and admission of air.

A film was prepared from the dispersion by casting, at 20 mils, coalescing, washing, softening and drying as in Example XX. The resultant tough, tear-resistant film was translucent and was transformed to brilliant clarity by application of pressure. When a portion of the film was clarified by application of 10,000 lb./sq. in. pressure, the following results were obtained with the General Electric Recording Spectrophotometer:

| Film | Thickness (cm.) | Percent Transmission or Reflectance (R) at Various Wavelengths | | |
|---|---|---|---|---|
| | | 4,000 A. | 5,500 A. | 7,000 A. |
| Opaque | 0.0083 | 5.2 (82.5R) | 19.5 (88.5R) | 41.2 (90R) |
| Clarified | 0.0064 | 82.5 | 88.5 | 90 |

The film is particularly useful as a tracing paper for reproduction of architectural drawings, maps, etc. In this process, the film is superposed on the original drawing which is then copied with a stylus. The resultant clear line drawing on translucent film serves as a negative for photoprinting positives of the drawings, particularly on photo papers sensitive to short wavelength light.

For the preparation of opaque films from acrylonitrile/isobutylene copolymers that are capable of clarification, it is preferred to use copolymers containing at least 23%, on a molar basis, of isobutylene. Although copolymers containing 30% or more of isobutylene exhibit the same properties, they are not so easy to prepare. Polyacrylonitrile and acrylonitrile/isobutylene copolymers containing about 18.6, 12.0, and 6.2 mol percent isobutylene were prepared. These also yield coalescible dispersions in aqueous calcium thiocyanate, but the final softened and dried films prepared therefrom are substantially clear initially and are not useful for controlled clarification applications. The solubility of the operable isobutylene copolymers in organic solvents is immaterial and either readily or difficultly soluble copolymers can be used.

*Example XXII*

An aqueous dispersion of polymethacrylonitrile was prepared by agitating the following materials in a glass bottle for 64 hours at 40° C.: 0.6 part potassium persulfate, 0.4 part sodium bisulfite, 3.0 parts sodium lauryl sulfate, 360 parts water and 240 parts methacrylonitrile. There was obtained a fluid aqueous dispersion having a solids content of 39.1% of substantially spherical polymethacrylonitrile particles.

To 80 parts of the above aqueous polymethacrylonitrile dispersion was added 128 parts of a 27.5–30% calcium thiocyanate aqueous solution. This mixture was ball-milled for four hours followed by filtration through a coarse cloth filter into a vacuum filtration glass flask containing a magnetic stirring bar. After removal of the filtering funnel, the flask was stoppered and gases removed from the liquid by alternate subjection to vacuum, then admission of air while the contents were being stirred. This is to prevent pinholes in the final film. The dispersion was then cast on a glass plate using a doctor knife set at 20 mils. The coated plate was placed in an air oven at 80° C. for about 15 minutes to effect coalescence of the dispersion and formation of a film. The film was then stripped and washed with water until the wash water was free of thiocyanate ion. At this point the gel film became opaque. The opaque film was then immersed in a 10% solution of dibutylphthalate in isopropyl alcohol for one-half hour to soften it. Excess liquid was removed and the opaque softened sheet was then clamped in position and dried at constant area in an air oven at 50° C. for one-half hour. After drying, the frame was removed, leaving an opaque dry film which was about 3 mils thick and which contained voids having an open-cell structure of about 0.8 micron diameter.

One piece of the film obtained as described above was placed in a typewriter from which the ribbon had been removed. Typing produced legible, clear typed characters in an opaque field. The typed opaque sheet was placed against photographic paper and exposed to light to produce sharp photo positives. It was also placed between two thin glass plates and used directly as a projection lantern slide.

Another piece of the opaque film was employed for producing hand-drawn characters by use of a pen dipped in liquid cyclic propylene carbonate. A film was obtained which had clear portions where the pen had been drawn across the film.

Transparent figures were also obtained by drawing a stylus across the surface of another piece of the opaque film. A vibratory impacting stylus was also employed to give clear figures. In contrast to this clarification, the use at ordinary pressures of a pen with aqueous base ink or a wax crayon was not effective in the production of preferential clarification, but did leave legible marks, showing the affinity of the unclarified film for common writing materials.

A replica of an artistic engraving on copper was transferred to a piece of the opaque film by placing the engraving face on the film followed by application of a pressure, which was such that the deepest inset areas received little pressure. The farthest projecting elements of the engraving caused complete clarification of the film at that point. The resultant impression of the engraving was used to prepare extremely sharp photo reproductions of the engraving.

The following table shows some physical properties of typical opaque polymethacrylonitrile films obtained as in the above example.

| Property | Result |
|---|---|
| Tensile | 1400 lb./sq. in. |
| Elong. at break | 11.4%. |
| Tensile Modulus | 135,000 lb./sq. in. |
| Tear | 2.25 g./mil. |
| Toughness (Charpy Impact) | 6.15 ft. lb./sq. in. |
| Water Vapor Permeability | 11,000 g. transported at 39.5° C. at 53 mm. Hg pressure differential of water vapor per mil thick film of 100 sq. meters per hour. |

Light transmission on G. E. recording spectrophotometer of 2.3 mil film:

| Wavelength, A | 4,000 | 4,560 | 5,500 | 7,000 |
|---|---|---|---|---|
| Percent Transmission | 2.25 | 3.00 | 4.75 | 7.25 |

In static pressure test using a one square inch die, the opaque polymethacrylonitrile film clarified slightly at about 5000 lb./sq. in. The linear vertical deformation was 42% without large variation in the range of 5000 to 15,000 lbs./sq. in. However, pressures of up to 50,000 lb./sq. in. can be employed.

Elevation of the temperature with and without added pressure effected clarification at 100° C. with preferred temperatures of about 120° C. which gave superior clearing of the film.

Further polymeric compositions giving opaque and clearable films are codispersions containing major amounts of polymethacrylonitrile, e. g., a codispersion of 85% of polymethacrylonitrile and 15% of acrylonitrile (25)/butadiene (75) copolymer.

In general, water-insoluble polymers having a molecular weight of 10,000 or higher and containing polar groups are suitable for use in this invention. The preferred polymers contain nitrogen and/or sulfur, polyacrylonitrile and polymethacrylonitrile being especially suitable. The most useful polymers are the vinyl polymers or copolymers which contain at least 25% of the vinyl unit. A particular advantage of the process of this invention is that polymers of high molecular weights, e. g., of the order of up to a million or more, surprisingly are even more susceptible to use than those of lower molecular weight. The properties of products obtained from the higher molecular weight materials are superior to those formed from lower molecular weight polymers. For practical reasons, the lower molecular weight polymers are the only ones readily useful in the processes such as those of U. S. 2,140,921 in which the polymers are dissolved in concentrated aqueous salt mixtures to form true solutions before formation of the shaped article.

Exact conditions of solubility and correspondingly the ability to be coalesced vary with each combination of polymer and salt. For example, whereas polyacrylonitrile can be satisfactorily coalesced at room temperature from aqueous calcium thiocyanate dispersions, polytetramethyleneurea requires a temperature of about 140° C. or higher with this salt.

The salts used in preparing the dispersions are water-soluble metal salts. These salts should be sufficiently soluble in water to yield 10% solutions, and preferably at least 30% solutions. Furthermore, concentrated aqueous solutions of the salts must be capable of dissolving the polymers at some temperature up to the boiling point of the salt solution (e. g., from 0–175° C. and generally at 25–90° C.).

This is readily determined by placing 0.1 g. of the finely divided polymer in 10 ml. of concentrated aqueous salt solution and stirring the mixture with heating, if necessary, and observing whether the polymer balls up to a coherent mass and/or passes into solution. Soluble, low molecular weight polymers tend to pass rapidly in solution, while soluble high molecular weight polymers absorb the salt solution and coalesce before slowly passing into solution.

Salts that meet the foregoing test are then used in the preparation of the coalescible dispersions. For this purpose, the concentrations of the aqueous salt solutions are kept below those at which the polymer will pass into solution, as described above.

Included among the salts which may be used are lithium thiocyanate, lithium iodide, lithium bromide, sodium thiocyanate, sodium iodide, potassium thiocyanate, magesium thiocyanate, calcium thiocyanate, calcium iodide, calcium bromide, calcium nitrate, manganese thiocyanate, zinc thiocyanate, zinc iodide, zinc bromide, zinc chloride, cadmium iodide and the like. The salts operable for use in the process of this invention are, in general, found among the water-soluble thiocyanates, iodides, bromides and chlorides of group I and II metals of atomic number 3–48 or compatible mixtures of these salts. The preferred salts are the thiocyanates.

The dispersions of this invention are stable and contain from 2 to 60% of salt, 2 to 35% of polymer and 25 to 95% water by weight. The preferred dispersions, those which give superior properties in the shaped products prepared therefrom, contain 4–55% of salt, 50–75% of water and 4–25% of polymer. In choosing the particular concentration one will, of course, avoid combinations which would give initially solutions rather than dispersions. In the preferred dispersions the weight ratio of salt to polymer is at least 1:2, preferably 1:1 to insure coalescence. When sufficient salt is present, the polymer particles are peptized to yield hydrophilic particles dispersed in the salt solution. Upon evaporation of sufficient water at a temperature at which the polymer is soluble, these peptized particles will coalesce. This coalescence, which is probably due to change of the surface of the dispersed polymer particles to the solution state, is marked by an abrupt change from an opaque fluid or paste-like milk or mucilage to a clear material ranging in viscosity and appearance from a clear syrup to a clear, tough rubber, dependent on such factors as the molecular weight and concentration of the dissolved polymer. Although many ionizable salts apparently yield peptized dispersions of the polymers of this invention, the peptized dispersions will not coalesce unless the salts are those showing solvent action for the polymer in the test referred to above. Results of this nature are not obtained by incorporation of water-miscible organic solvents for the polymers of this invention with the aqueous polymer dispersions. In this case, the dispersions of polymer particles are almost immediately coalesced, and further addition, even to the point of solution does not lead to fluid dispersions.

In addition to water, "solvent" salt and polymer the dispersions can contain dispersing agents, pigments, "non-solvent" salts, dyes, clay, silica, alcohol, acetone and similar materials frequently added to shaped articles, such as filaments and films.

The dispersions are readily prepared by mixing finely divided polymer with aqueous salt solution in the amounts desired. The polymer should have a particle size less than about 15 microns, preferably 0.005–1.5 microns. Such sizes are obtained by mechanical means, such as by use of micronizers, homogenizers, ball mills, and similar pulverizers if the polymer used is not already in a finely divided state.

Suspensions of appropriately fine polymer as obtained from emulsion polymerization processes in aqueous media may be employed directly. The metal salt-containing dispersions are prepared at any convenient temperature that does not cause polymer solution or degradation, preferably at 0–40° C. Low temperatures are employed in some cases to avoid precoalescence due to local high salt concentrations during mixing the polymer suspension with the salt solution.

The dispersions obtained are readily fluid, especially when polymer concentration is less than about 25% by weight. They are readily employed in the preparation of shaped objects such as films and fibers. The steps involved in the preparation of shaped objects from the polymer dispersion include the shaping of the dispersion in substantially the desired form such as casting it on a plate in a thin layer for the preparation of a film or by wiping it into grooves on a wheel or belt or by extrusion through a spinneret for the preparation of a fiber. Up to this stage, the dispersion is a milky fluid of low viscosity. The second step is the coalescence step in which the milky dispersion is transformed into a clear, shaped object. This step is accomplished by the removal of part of the water from the dispersion by evaporation. While room temperatures or lower can be used, it is generally preferred that heat, e. g., temperatures of the order of 70–175° C., be employed momentarily in transformation of the fluid dispersion to a transparent, coherent film or fiber since the time is much less. This is particularly necessary when a continuous process is employed in the preparation of films and fibers and it is desired that the coalescence step consume a time of the order of a few seconds. It is also necessary for polymers of high minimum solution temperature. With short contact times, the actual temperature achieved is relatively immaterial with respect to the degradation of polymer. The third step involves the removal of the salt from the shaped polymer and is readily effected by washing with water. The resulting polymer structure may be dried, then aftertreated with boiling water, e. g., stretched to orient the molecules to effect increase in physical properties. A preferred manner of orientation is to draw the coalesced polymer/salt/water object, then proceed with washing and drying with the object under tension.

In addition to being uniquely susceptible to plasticization, the dispersion-cast polyacrylonitrile gels have a surprising affinity for dyestuffs. For example, several acetate dyes and a vat dye have been applied to drawn gel fibers to achieve medium to strong shades of color that are quite fast to soaping off. The films and fibers obtained by the process of this invention have utility in textile and film applications.

By this invention, the difficulties of fabrication from solutions of high molecular weight polymers such as balling up, high viscosities and chemical degradation are avoided since the dispersions are fluid, and the nonpolymeric materials therein do not react with the polymers at the temperatures used. Furthermore, the dispersions can be, and preferably are, quite concentrated with respect to the amount of polymer present. A further advantage of the process of this invention is that isolation of polymer, when it is prepared as an aqueous dispersion, is not required.

It is disclosed in U. S. 2,352,725 that certain drawn polyamide films can be prepared that are pearlescent. They contain elongated voids and can be cleared by application of pressure. The opaque, clearable films of this invention, however, can be prepared by the process of this invention disclosed above using dispersions of the several selected polymers in calcium thiocyanate. The opacity develops when the salt is washed out and leaves cavities. These are closed by application of heat and/or pressure. Normally, upon washing out the salt, the voids in most films close up right away to give a clear film.

Any departure from the above description which conforms to the present invention is intended to be included within the scope of the claims.

I claim:

1. A process for the production of a shaped article from a synthetic, water-insoluble organic polymer which comprises dispersing said polymer in the form of discrete particles having a size less than about 15 microns in an aqueous mixture comprising water and a solvent metal salt for said polymer dissolved therein, the said salt being taken from the group consisting of the water-soluble thiocyanates, iodides, bromides and chlorides of group I and II metals of atomic number 3 to 48 of the periodic table and being present in an amount at least one-half of the weight of the polymer but in an amount insufficient to form a salt solution which dissolves said polymer; forming the resultant dispersion containing about 2% to about 60% of said salt, about 25% to about 95% water and about 2% to about 35% of said polymer, all by weight, into the shape of said article; evaporating water from said article until coalescence occurs; and washing the salt from the resultant shaped article.

2. A process in accordance with claim 1 wherein said polymer is a vinyl polymer having a molecular weight in excess of 10,000 and containing polar groups.

3. A process in accodance with claim 1 wherein said dispersion contains from about 4% to about 55% of said salt, about 50% to about 75% of water and about 4% to about 25% of said polymer, all by weight.

4. A process in accordance with claim 1 wherein said polymer is a polymer of acrylonitrile.

5. A process in accordance with claim 1 wherein said polymer is a homopolymer of acrylonitrile.

6. A process in accordance with claim 1 wherein said article while in the gel state is immersed in a medium containing a plasticizer for said polymer.

7. A process in accordance with claim 1 wherein said polymer has a molecular weight of at least 10,000.

8. A process in accordance with claim 1 wherein evaporating water is accomplished at a temperature of about room temperature to about 175° C.

9. A process in accordance with claim 1 wherein said dispersion is formed at a temperature of about 0° C. to about 40° C.

10. A process in accordance with claim 1 wherein said salt is a bromide.

11. A process in accordance with claim 1 wherein said salt is a thiocyanate.

12. As a new composition of matter a dispersion of discrete particles having a size less than 15 microns of an acrylonitrile polymer predominating in acrylonitrile units in an aqueous mixture comprising water and a solvent metal salt for said polymer dissolved therein, the said salt taken from the group consisting of the water-soluble thiocyanates, iodides, bromides and chlorides of group I and II metals of atomic number 3 to 48 of the periodic table being present in an amount at least one-half of the weight of the polymer but in an amount insufficient to form a salt solution which dissolves said polymer, said dispersion containing about 2% to about 60% of said salt, about 25 to about 95% of water and about 2% to about 35% of said polymer, all by weight.

13. A process in accordance with claim 1 wherein said salt is calcium thiocyanate.

14. A process in accordance with claim 1 wherein said article is a fiber.

15. A process in accordance with claim 1 wherein said article is a film.

16. A process in accordance with claim 1 wherein said article is an opaque film having an open-cell structure.

17. A process in accordance with claim 16 wherein said film is made from polymethacrylonitrile.

18. A process in accordance with claim 16 wherein said film is made from an acrylonitrile/isobutylene copolymer.

19. A process in accordance with claim 1 wherein the said particle size is between 0.005 and 1.5 microns.

20. A composition in accordance with claim 12 wherein the said particle size is between 0.005 and 1.5 microns.

References Cited in the file of this patent

UNITED STATES PATENTS

| | | |
|---|---|---|
| 217,448 | Courtenay | July 15, 1879 |
| 2,140,921 | Rein | Dec. 20, 1938 |
| 2,385,920 | Jenkins | Oct. 2, 1945 |
| 2,572,931 | Helle | Oct. 30, 1951 |
| 2,585,444 | Coxe | Feb. 12, 1952 |
| 2,605,246 | Cresswell et al. | July 29, 1952 |
| 2,628,945 | Wayne | Feb. 17, 1953 |